US012062467B2

(12) United States Patent
Dupont et al.

(10) Patent No.: US 12,062,467 B2
(45) Date of Patent: Aug. 13, 2024

(54) DEVICE FOR APPLYING MARKING TUBES ONTO A CABLE

(71) Applicant: KOMAX HOLDING AG, Dierikon (CH)

(72) Inventors: Maxime Dupont, Toulouse (FR); Stefan Hutzli, Rotkreuz (CH); Stéphane Rougier, Pompertuzat (FR)

(73) Assignee: KOMAX HOLDING AG, Dierikon (CH)

( * ) Notice: Subject to any disclaimer, the term of this patent is extended or adjusted under 35 U.S.C. 154(b) by 1003 days.

(21) Appl. No.: 16/932,336

(22) Filed: Jul. 17, 2020

(65) Prior Publication Data

US 2021/0020338 A1 Jan. 21, 2021

(30) Foreign Application Priority Data

Jul. 19, 2019 (EP) .................................... 19305960

(51) Int. Cl.
*H01B 13/34* (2006.01)
*B21F 23/00* (2006.01)
(Continued)

(52) U.S. Cl.
CPC ........... *H01B 13/344* (2013.01); *B21F 23/00* (2013.01); *B41J 3/407* (2013.01); *H01B 7/368* (2013.01);
(Continued)

(58) Field of Classification Search
CPC ...... H01B 13/344; H01B 13/34; H01B 7/368; H01B 13/0003; B21F 23/00; B21F 23/002; B21F 23/005
See application file for complete search history.

(56) References Cited

U.S. PATENT DOCUMENTS

| | | | | |
|---|---|---|---|---|
| 4,603,465 A * | 8/1986 | Bretti | H01B 13/344 | 29/745 |
| 5,727,454 A * | 3/1998 | Takikawa | H01B 13/344 | 100/9 |

(Continued)

FOREIGN PATENT DOCUMENTS

| | | |
|---|---|---|
| GB | 2197292 A | 5/1988 |
| JP | 2017162677 A | 9/2017 |
| JP | 2017162678 A | 9/2017 |

OTHER PUBLICATIONS

EP Search Report, dated Jan. 17, 2020, from corresponding EP application No. 19 30 5960.

*Primary Examiner* — Abbie E Quann
(74) *Attorney, Agent, or Firm* — NIXON & VANDERHYE

(57) ABSTRACT

Disclosed is a device for applying marking tubes onto cables including: a driving mechanism for a cable along a driving axis; at least one buffer pipe in a producing position aligned with the driving axis, the buffer pipe having dimensions adapted both for a cable to be marked to run through the buffer pipe and for a number of marking tubes to be threaded onto the buffer pipe; a pushing unit engaging and pushing along the driving axis at least one first out marking tube of the marking tubes threaded on the buffer pipe until this first out marking tube exits the buffer pipe and is released onto the cable. Also disclosed is a method for applying marking tubes onto cables using a buffer pipe. The cable is always driven in the same forward direction and there is no limitation of cable length or marking tube number or location.

19 Claims, 13 Drawing Sheets

(51) Int. Cl.
*B41J 3/407* (2006.01)
*H01B 7/36* (2006.01)
*H01B 13/00* (2006.01)

(52) U.S. Cl.
CPC ......... *H01B 13/0003* (2013.01); *H01B 13/34* (2013.01)

(56) References Cited

U.S. PATENT DOCUMENTS

| | | | | |
|---|---|---|---|---|
| 6,321,643 | B1 * | 11/2001 | Takikawa | B21C 51/005 53/399 |
| 2018/0241191 | A1 | 8/2018 | Kirst | |

* cited by examiner

ABC 123
97
98

DEVICE FOR APPLYING MARKING TUBES ONTO A CABLE

FIELD OF THE INVENTION

The Invention relates to a marking tubes applicator for marking cables.

Cables or wires, in particular cables used in the aeronautical industry such as electrical cables arranged in aircrafts, are usually marked with identification information, in order to next facilitate the allocation or implementation of the cables in their target device and place. In some industries, such as the aircraft industry, the markings are mandatory. Thus, in the context of the invention, a marking tube is a tubular sleeve having a minimum length (the length of a marking tube being the dimension of the tube along its axis which is also the dimension of the tube along the axis of the cable once the tube is applied onto a cable), long enough for the marking tube to bear a piece of information including for example a word or an acronym or a reference number potentially in the form of a bar code, etc.

BACKGROUND OF THE INVENTION

There are many ways to mark a cable, e.g. wrapped around labels, embossing, laser or inkjet printing on the outer sheath of the cable or applying marking tubes to name a few. In some cases, the tubes are the only option due to durability requirements or cable properties (e.g. colour regulations of the marking or twisted cables with no extra outer layer likely to be printed). Tube applicators are known in the market, such as the device disclosed by US2018241191 from Artos®. The existing devices are good to put the marking tubes at the cable ends but not suitable to put it in the mid-section of the cable. JP2017162677A and present a machine to put marking tubes at any desired position on a cable. The cable is transported to a tube gripper squeezing the tube to keep it open. The cable is fed through the tube until the desired position is reached. The tube gripper releases the marking tube and the cable is fed further through the machine. To place three tubes on one cable (one tube at each end and one in the mid-section), the cable is first fed through the marking tube until the mid-section reaches the tube gripper. After the marking tube is released, the cable is transported out of the device into an intermediate cable storage. The tube gripper places a new tube in the way of the cable and the cable is fed backwards until it reaches the desired position with its second end. The second marking tube is placed. The cable is fed back even more, until it exits the device again into a second intermediate cable storage. For the third tube the cable is fed forward again into the device. When the cable reaches the position for the last marking tube, the tube is released. The cable is now finished and is transported out of the machine. This back and forth movements make the process slow and slower the more marking tubes are used for each cable. The positioning starts with the mid-section, as the positioned tube might otherwise interfere with the next tube, if it is led through the next marking tube. The length of the cable processed by such a machine is restricted to the length of the intermediate cable storage, where the cable enters after each marking tube is placed.

SUMMARY OF THE INVENTION

The problem to be solved is therefore the rapid positioning of several marking tubes on a cable with almost no restriction to the length of the cable and with almost no restriction to the number of tubes to be placed nor to their location on the cable.

To this end, the invention proposes a device for applying marking tubes onto cables comprising a marking zone where a cable to be marked can be received and where a number of marking tubes to be applied onto the cable to be marked can be released onto the cable to be marked, and a driving mechanism for driving forward the cable to be marked along a driving axis, characterized in that it comprises:

a buffer pipe which can be arranged in a producing position in the marking zone where the buffer pipe is aligned with the driving axis, the buffer pipe having an inner diameter higher than the diameter of the cable to be marked whereby the cable to be marked can run forward along the driving axis through the buffer pipe in the producing position, an outer diameter less than the inner diameter of the marking tubes to be applied, whereby the marking tubes to be applied can be threaded onto the buffer pipe, a length at least equal to the length of the number of marking tubes to be applied placed next to the other on the buffer pipe whereby the buffer pipe in the producing position can be loaded with the number of marking tubes to be applied placed next to the other, a pushing unit configured for engaging and pushing forward along the driving axis at least one, first out, of the marking tubes to be applied threaded on the buffer pipe until this first out marking tube exits the buffer pipe and surrounds the cable to be marked, and then releasing the first out marking tube onto the cable to be marked.

It is to be noted that a "buffer pipe" in the meaning of the invention is firstly a pipe, that is to say a cylindrical tubular member. A "buffer pipe" in the meaning of the invention is preferably a member in one piece. A "buffer pipe" in the meaning of the invention is preferably a cylindrical tubular member having a circular cross section (but cross sections of other shapes are not excluded although prima facie less convenient; in case of a buffer pipe having a non-circular cross section, the expression "inner diameter" of the pipe means the minimum dimension of the hole of the pipe in a transverse plane, and the "outer diameter" means the maximum dimension or bulk of the pipe in a transverse plane).

Thus, according to the invention, a buffer pipe is loaded with all the marking tubes needed for a cable. The cable is fed through the buffer pipe and at the end of the buffer pipe the marking tubes are pushed from the buffer pipe onto the running cable. When the next target point (point to be marked) of the cable reaches the end of the buffer pipe, the next tube is pushed from the buffer pipe onto the cable. The marking tubes loaded on the buffer pipe can thus be successively pushed out of the buffer pipe to be applied onto the cable which is running through the buffer pipe. This process is repeated until all the marking tubes needed are applied on the cable.

The main benefit is that the cable is always driven in only one direction, reducing process time and restrictions to the cable length become obsolete.

According to a possible feature of the invention, the marking tubes applying device further comprises:

a preparing zone, apart from the marking zone, including a preparing position for the buffer pipe where the buffer pipe is aligned with a preparing axis, a gripping unit for loading a buffer pipe in the preparing position with marking tubes, the gripping unit being configured for picking up a marking tube from a delivering slot, moving along the preparing axis until the picked up marking tube totally engage the buffer pipe placed in the preparing position, and then releasing the picked up marking tube, a shifting mechanism for shifting the buffer pipe between the producing position and the preparing position.

According to a possible feature of the invention, the marking tubes applying device further comprises a plurality of buffer pipes, and the shifting mechanism is configured for positioning either (of the buffer pipes) in the preparing position and in the producing position.

Providing several buffer pipes allows enhancing the productivity of the device. One of the buffer pipe can be placed in the preparing position so as to be loaded with marking tubes, while another buffer pipe is in the producing position and the marking of a cable is in progress. Another advantage is that it is possible to handle various type of marking tubes having different diameter or to produce various type of cable having different number of marking tubes or having different lengths, as will be more understood here after.

For example, the plurality of buffer pipes comprises buffer pipes having various outer diameters for receiving marking tubes of different diameter.

Alternatively or in addition, the plurality of buffer pipes comprises at least one long buffer pipe and at least one short buffer pipe having the same outer diameters but having different lengths for receiving different numbers of marking tubes of the same diameter and/or for receiving marking tubes having different lengths (the length of a marking tube being the dimension of the tube along its axis which is also the dimension of the tube along the axis of the cable once the tube is placed onto the cable). This allows producing various series of cables having different lengths or having the same length but wearing different numbers of marking tubes and/or marking tubes of different lengths.

In a preferred embodiment, the plurality of buffer pipes comprises several pairs of buffer pipes, the two buffer pipes of a same pair being identical, buffer pipes of different pairs having different outer diameters (for receiving marking tubes having different diameters) or different lengths (for receiving different numbers of marking tubes or marking tubes having different lengths). This allows preparing one buffer pipe of the pair (placed on the preparing position), while the other buffer pipe of the pair (placed on the producing position) is being used for marking a cable. This allows producing identical cables successively without time out between the cables, by shifting the two buffer pipes of the pair between the producing position and the preparing position each time a cable is completed.

According to a possible feature of the invention, the shifting mechanism comprises a carousel bearing the buffer pipe(s). This arrangement is advantageous as it allows providing several pairs of buffer pipes on a single element meeting the function of the shifting mechanism of the invention.

According to a possible feature of the invention in a device including a carousel and at least one pair of identical buffer pipes, for each pair of buffer pipes, the buffer pipes of the pair are arranged diametrically opposed on the carousel.

According to a possible feature of the invention, for marking tubes having a first length, the pushing unit includes a first set of parallel and coplanar blades arranged on a first side of a shaft parallel to the driving axis, the blades being equally spaced apart one another along the shaft with a first interval corresponding to the first length of the marking tubes, the shaft being rotated and translated along the driving axis such that the blades are moved in a pilgrim step movement (forward, up, backward and down again).

In an embodiment having a pushing unit with a first set of blades and having at least one long buffer pipe and at least one short buffer pipe, the pushing unit advantageously includes a second set of parallel and coplanar blades also born by the shaft which bears the first set of blades but extending on a second side of the shaft, and being also equally spaced apart one another along the shaft with the first interval, the first set of blades having a number of blades corresponding to the number of marking tubes that can be threaded onto the longest buffer pipe and the second set of blades having a number of blades corresponding to the number of marking tubes that can be threaded onto the shortest buffer pipe.

The fact that the first set of blades is arranged at one (first) side of the shaft and the second set of blades is arranged at another (second) side of the shaft means that either the blades of the two sets are not arranged in a same plane (that is to say the blades of the first set extend in a first plane including the shaft and the blades of the second set extend in a second plane including the shaft but different from the first plane, the two planes forming an angle there between at the shaft), or all the blades are in a same plane including the shaft but the blades of the second set extend in an opposite direction from the blades of the first set (that is to say the second set of blades is diametrically opposed to the first set of blades around the shaft).

In an embodiment having a pushing unit with a first set of blades and intended to be used with two types of marking tubes, namely a first type of marking tubes having a first length and second type of marking tubes having a second length, the pushing unit advantageously includes a second set of parallel and coplanar blades also born by the shaft which bears the first set of blades but extending on a second side of the shaft, the blades of the second set being equally spaced apart one another along the shaft with a second interval corresponding to the second length of the second type of marking tubes.

In another embodiment, the pushing device could have only one pushing blade or a gripper able to move along the entire length of the buffer pipe in the producing position so as to move each marking tube individually. In a further embodiment, the pushing device might be a belt drive brought into contact with the marking tubes.

According to a possible feature of the invention, the gripping unit in the preparing zone comprises a first opening head with suction pads and a second opening head with squeezing jaws, the first and the second opening head being arranged on a tilting common mounting, the mounting being tilted to use alternatively the first or the second opening head.

According to a possible feature of the invention, the preparing zone comprises a printer arranged upstream of the delivering slot.

According to a possible feature of the invention, for a device intended to be used with marking tubes of various types having different diameters and/or lengths, the preparing zone comprises several delivering slots, namely one delivering slot for each type of marking tubes, the gripping unit being configured to be translated between the preparing position and each of the delivering slots. In that embodiment, the preparing zone preferably comprises several printers, namely one printer upstream of each delivering slot.

The invention extends to a method for applying marking tubes to cables, characterized in that it uses a device according to the invention and in that it comprises the following steps:

- a buffer pipe previously loaded with a needed number of marking tubes is placed in the producing position,
- a cable to be marked is pushed forward along the driving axis through the buffer pipe in producing position,
- when a target point on the cable to be marked reaches an exit end of the buffer pipe, the first out marking tube on the buffer pipe is pushed forward along the driving axis until it exits the buffer pipe and is released onto the cable,
- the cable is kept on running forward along the driving axis and when the next target point on the cable to be marked reaches the exit end of the buffer pipe, the new first out marking tube on the buffer pipe is pushed forward along the driving axis until it exits the buffer pipe and is released onto the cable to be marked, and so on until all the marking tubes initially loaded on the buffer pipe are thus applied onto the cable to be marked.

It appears clearly that the cable is always driven in the same direction and that the method according to the invention is very fast and very efficient. Moreover, it can be identically applied regardless of the length of the cable as well as the needed number of marking tubes, and there is no limitation concerning neither the length of the cable nor the number and the location of the marking tubes.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
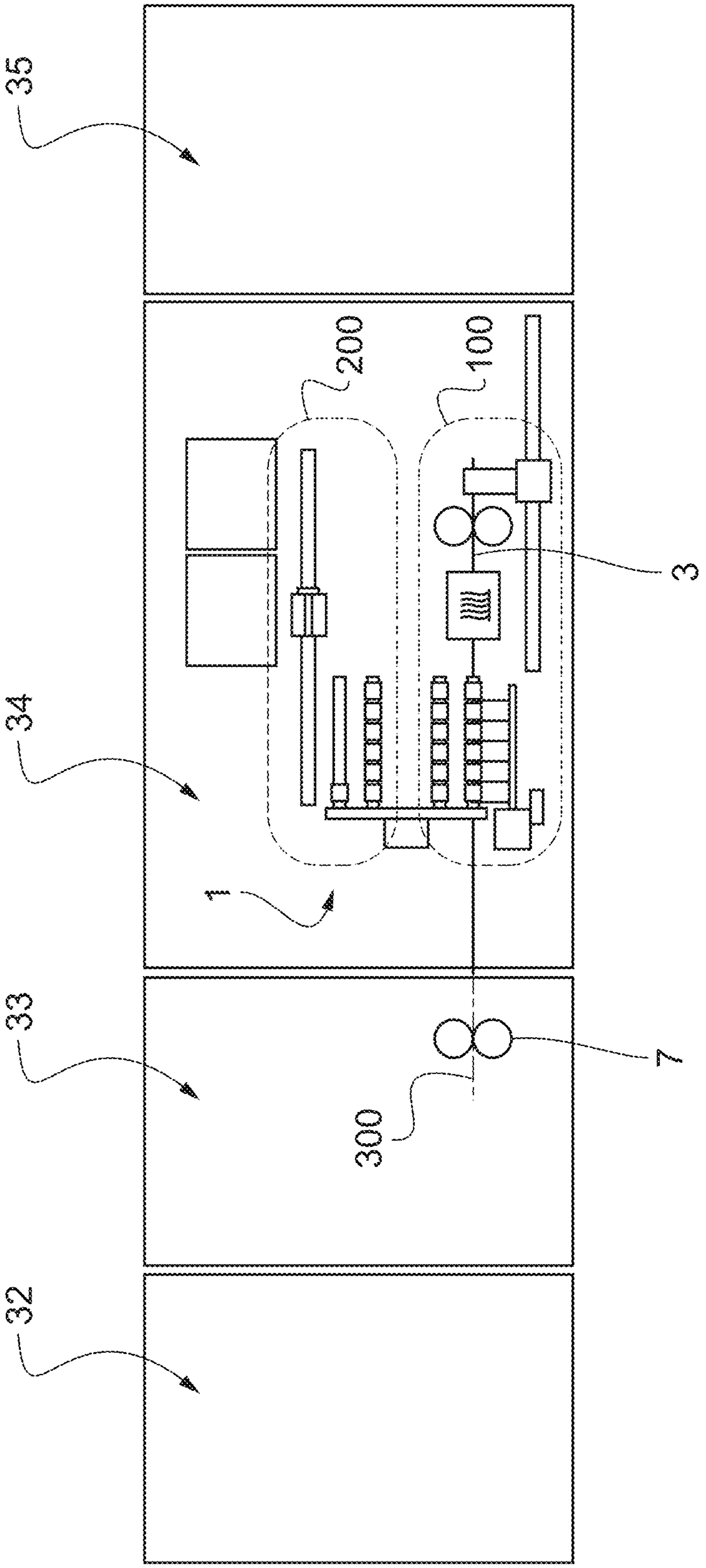
FIG. 1 is a schematic top view of a production line incorporating a device for applying marking tubes according to the invention.

FIG. 1 shows a cables production line having a marking tube applying station 34 which includes a device 1 for applying marking tubes according to the invention, hereafter referred to as the tube applicator 1. At the beginning of the line is a cable supplying station 32. The cable supplying station 32 can be as simple as a single, tension operated cable dereeler (not represented) for unwinding a coil of cable intended to be cut in cables of given lengths. Alternatively, the cable supplying station 32 can be a sophisticated, multi-cable power creel with automatic cable selector. The cable supplying station 32 also includes cable feeding and guiding means (not represented) for driving the cable exiting from the dereeler or the cable selector in such a way that the driven cable 3 enters and passes through the tube applicator 1 on a driving axis 300.

Upstream of the marking tube applying station 34, the production line also comprises a measuring and cutting station 33 including a cable cutter and additional cable guiding and/or driving means (not represented). In some cases, it might be desirable to add further cable processing modules between the cable measuring and cutting station 33 and the tube applicator 1 according to the invention.

The production line can also comprise a next processing station 35 downstream of the marking tube applying station 34. The next processing station can be a coiling station or another processing device.

Figures 2, 3:
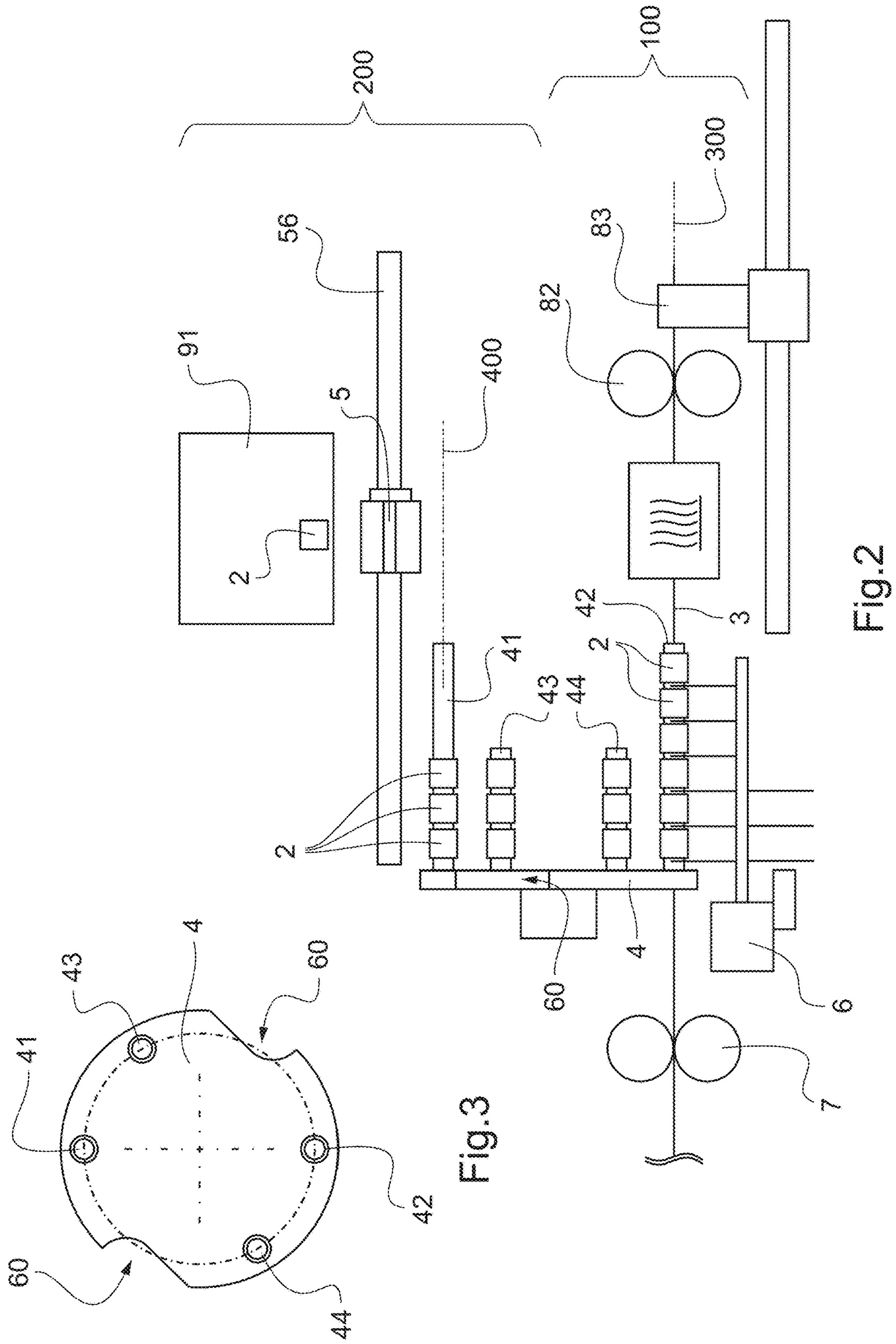
FIG. 2 is a schematic top view of a device for applying marking tubes according to a first embodiment of the invention. This first embodiment is intended to be used with only one size of marking tubes and it includes only two pairs of buffer pipes.
FIG. 3 is a schematic side view of the carousel of the device of FIG. 2.

A first embodiment of the tube applicator 1 can be observed in FIG. 2. In this first embodiment, the tube applicator 1 comprises two pairs of buffer pipes 41 to 44 (four pipes in total) mounted on a carousel 4. The two buffer pipes 41/42 (or 43/44) of a same pair are identical, whereas buffer pipes 41/43 (or 41/44 or 42/43, or 42/44) of different pairs have different lengths. All the buffer pipes have the same outer diameter.

This first embodiment is to be used with marking tubes having all the same diameter, this diameter being slightly more than the outer diameter of the buffer pipes.

This configuration is meant to produce cables having different lengths but intended to be marked with marking tubes of a same diameter. The pair of short buffer pipes 43,44 allows to handle the shortest cables and is dimensioned to hold enough marking tubes for these cables. The pair of long pipes 41,42 hold the maximum number of marking tubes needed for the longest cables. Usually the longer a cable, the more marks (and therefore marking tubes) are required. For example, the longer pair of buffer pipes is 1 m long to hold all the marking tubes required for the longest cables usually implemented in passenger aircrafts. These long buffer 41,42 pipes are not adapted for producing cable having a length less than 1 m. If the shortest cables to be produced are 0.9 m long or even less, the pair of short buffer pipes must be significantly shorter to allow for cable transportation.

In order to use a wide range of cables having different diameter with one given buffer pipe outer diameter, the buffer pipes have thin walls. For example, for marking tubes having an inner diameter of 12.7 mm, buffer pipes having an outer diameter of 12 mm and an inner diameter of 11 mm can be used. Such buffer pipes are convenient for a range of cable diameters between 1 mm to 10 mm.

The marking tube applicator 1 is organized in two zones (see also FIG. 1): a preparing zone 200 where a buffer pipe 41 in a preparing position aligned with a preparing axis 400 can be loaded with marking tubes 2, and a marking zone 100 where the marking tubes 2 previously loaded on a buffer pipe 42 which is now in a producing position aligned with the driving axis 300, can be applied onto a cable 3 running on the driving axis 300 through the buffer pipe in the producing position.

A marking tube supplying station is arranged next to the tube applicator 1 (this station is considered to be an element outside the claimed applicator), adjacent the preparing zone 200. The marking tube supplying station comprises a marking tube printer 91. The printer 91 provides marking tubes 2 with the required identification text. A gripping unit 5 (which is part of the claimed applicator), with a camera for quality control, is arranged in the preparing zone 200. The gripping unit 5 can be translated along a rail 56 parallel to the preparing axis 400.

Figure 11:
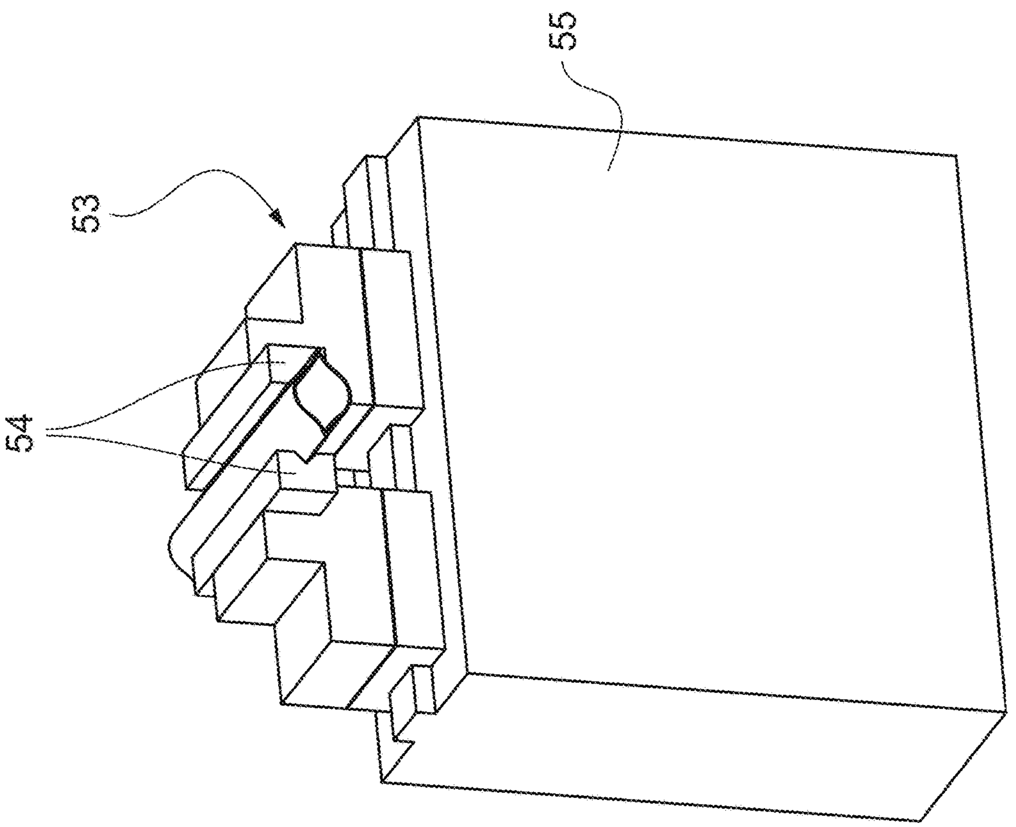
FIG. 11 is a schematic perspective view of another embodiment of a gripping unit in a device according to the invention, with jaws opening (pushing) a marking tube.
Figure 10:
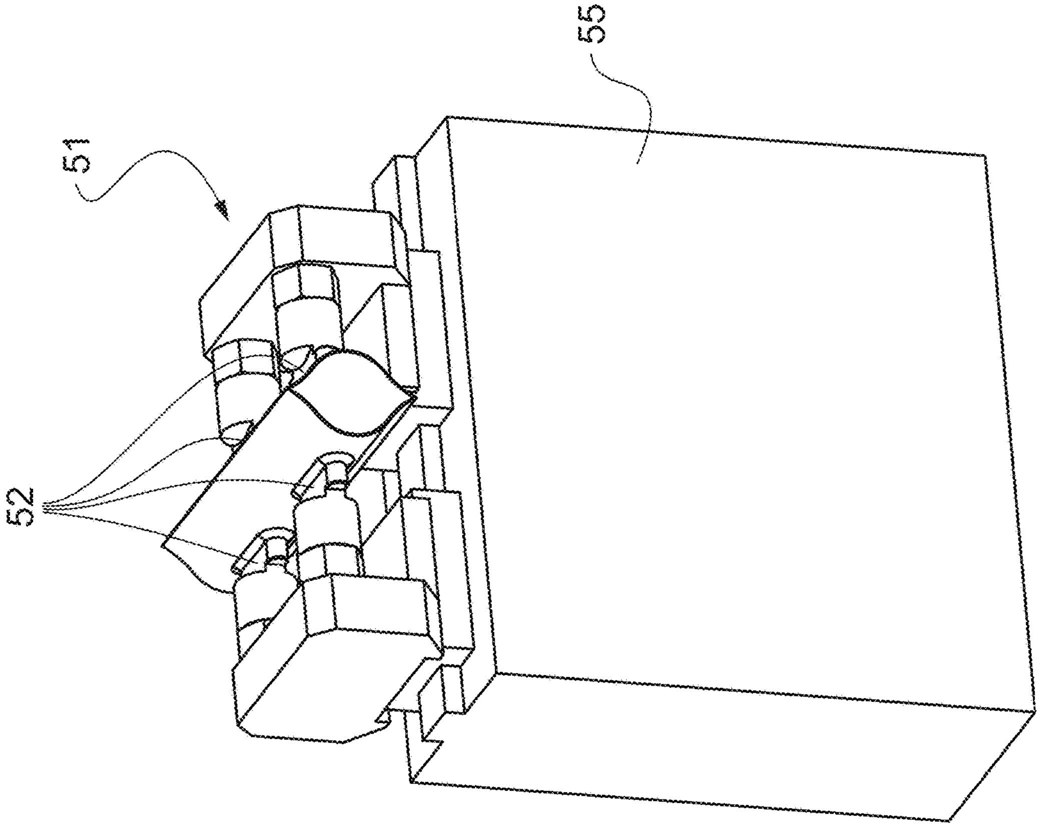
FIG. 10 is a schematic perspective view of an embodiment of a gripping unit in a device according to the invention, with suction pads opening (pulling) a marking tube.
Figure 12:
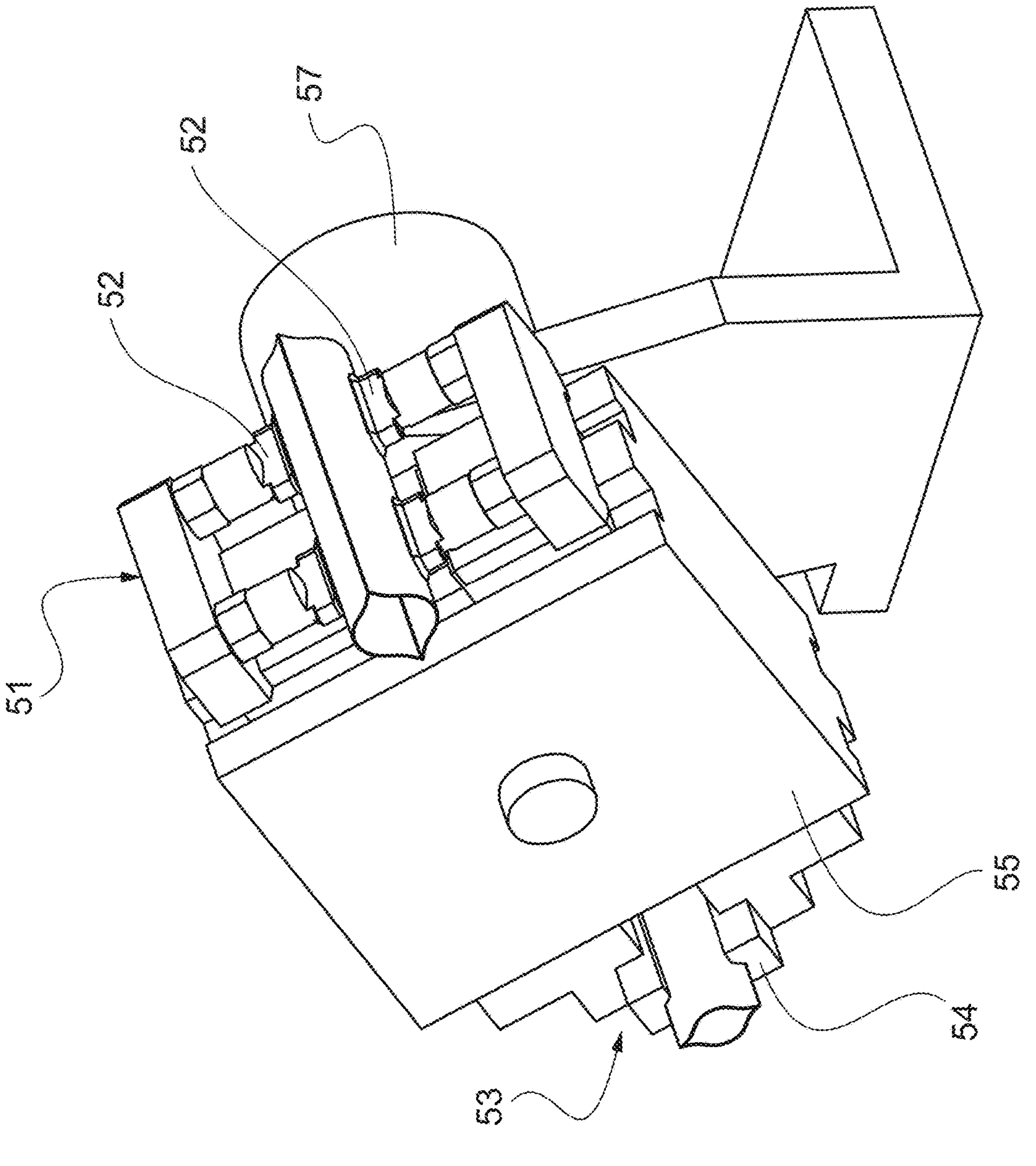
FIG. 12 is a schematic perspective view of another embodiment of a gripping unit in a device according to the invention, with suction pads opening (pulling) a marking tube and squeezing jaws opening (pushing) another marking tube.

Marking tubes are always packaged in a flat configuration in order to be printed in a printer. To be applied onto a cable, a marking tube must first be open. Therefore, the gripping unit 5 can have an opening head 51 equipped with suction pads 52 that pull the tube open, as shown in FIG. 10. In an embodiment for marking tubes having a lesser diameter, the opening head 51 with suction pads 52 can be replaced by an opening head 53 equipped with squeezing jaws 54 having a shape adapted to squeeze (push) the marking tube open, as illustrated in FIG. 11. In another embodiment adapted for various marking tubes, the gripping unit advantageously includes two opening heads, namely an opening head 51 with suction pads 52 and an opening head 53 with squeezing jaws 54, mounted on opposite faces of a same base or mount 55 as shown in FIG. 12.

The gripping unit has a tilting mount or base 55 bearing the opening head(s). The tilting base 55 can be tilted thanks to an actuator 57 (see FIG. 9 or 12). This tilting can be provided for two reasons. If necessary (depending on the way the marking tubes exit from the printer 91), the base 55 can be tilted such that the opening head can be moved from a picking up position where it can pick up a marking tube 2 exiting from a delivering exit 910 of the printer 91, to a loading position where the picked up marking tube 2 is aligned with the preparing axis 400 to be loaded on the buffer pipe 41 in the preparing position. The other purpose is to "change" the opening head in use in case of a gripping unit having two opening heads.

When a new coil of cable is loaded in the cable supplying station 32, the carousel 4 is placed in a starting position where a notch 60 (see FIG. 3) of the carousel is aligned with the driving axis 300. The coil of cable is unwound and the cable 3 is driven along the driving axis 300, guided by a series of guiding rolls upstream of the tube applicator 1, including guiding rolls 7 in the measuring and cutting station 33. The cable 3 enters the tube applicator 1 through the notch 60 until a certain length. Then a "zero cut" is preformed and the cut-off part of the cable 3 falls out of the device. This is to create a clear starting point for production. Then the carousel 4 is rotated in the desired position for production.

Figure 8A:
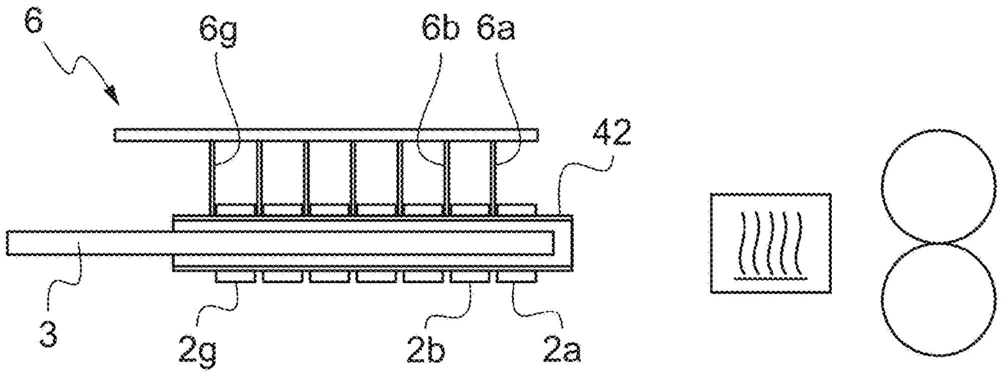
FIG. 8*a*-8*d* are simplified representations of steps of a tube applying process according to the invention.
Figure 8B:
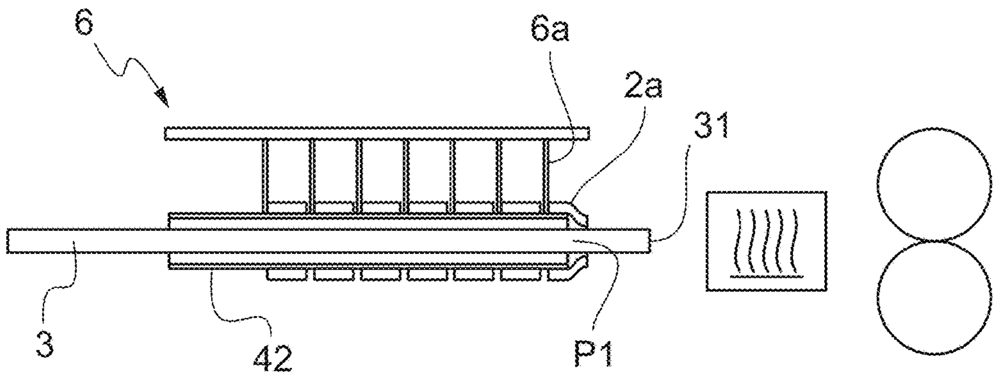

Then the carousel 4 is rotated again until a previously prepared buffer pipe corresponding to the cable to be produced, e.g. the buffer pipe 42, is in producing position. The cable is pushed again and the running cable 3 enters the buffer pipe 42 in producing position as shown in FIG. 8*a*. The cable 3 is pushed along the buffer pipe 42 (FIG. 8*b*).

Figure 8C:
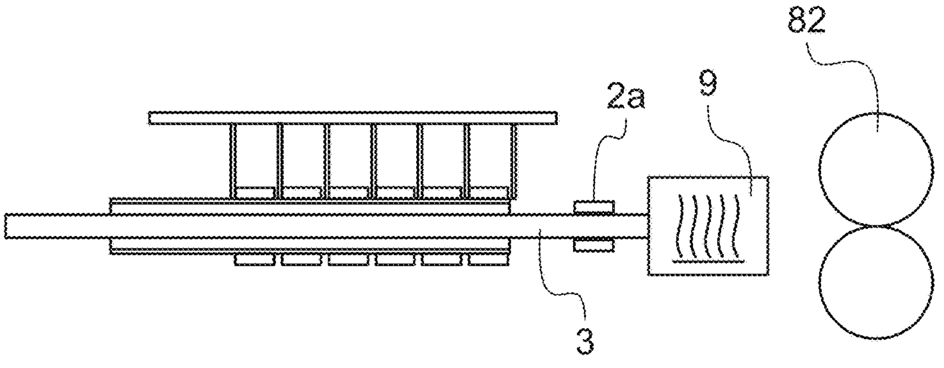
Figure 8D:
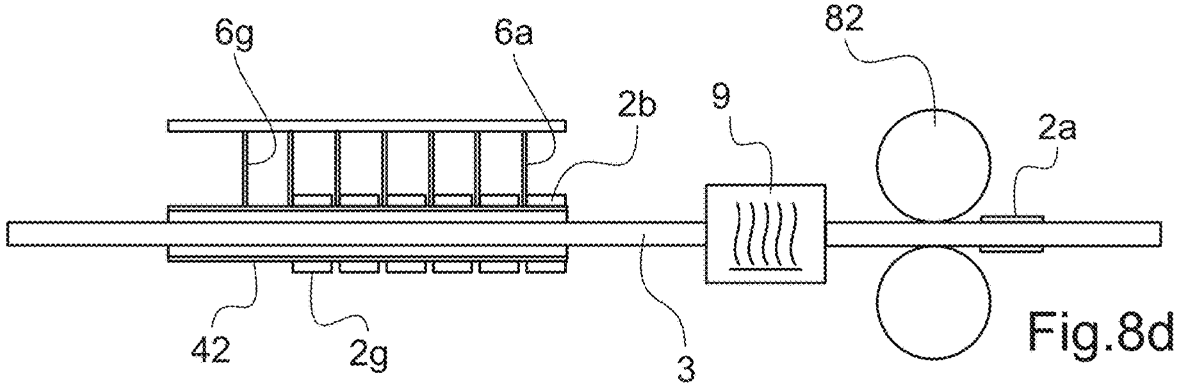

The different marking tubes 2*a*-2*g* are to be placed at predetermined target points P1 . . . Pg of the cable. The first target point P1 can be at the free end 31 of the cable or very close to this free end 31. When the first target point P1 is about to exit the buffer pipe 42, the pushing unit 6 is moved forward along the driving axis 300 such that the first blade 6*a* of the pushing unit pushes the first out marking tube 2*a* (this first out marking tube being the last one that was loaded on the buffer pipe in the preparing zone) such that the first out marking tube 2*a* exits the buffer pipe 42 (FIG. 8*b*). When the marking tube 2*a* totally applies onto the cable (FIG. 8*c*), the pushing unit 6 is rotated up such that the blades disengage the marking tubes; it is then moved backward along the driving axis (on a distance corresponding to the length of the loaded marking tubes) and next rotated down such that the blades engage the marking tubes 2*b*-2*g* still present on the buffer pipe (FIG. 8*d*) with the first blade 6*a* located just behind the second marking tube 2*b* (which is now the next first out marking tube).

The cable keeps on running forward, pushed by the driving means arranged upstream of the tube applicator 1 and/or by the driving means arranged in the tube applicator downstream of the buffer pipe in producing position.

In order to be used with marking tubes made of heat-shrinking material, the tube applicator 1 includes a heating unit 9, for example hot air gun, located downstream of the buffer pipe in the producing position. By passing through the heating unit 9, the marking tube 2 contracts and secures to the cable. Downstream of the heating unit 9, the cable enters a pair of guiding rolls 82.

The cable is driven forward until the second target point reaches the exit end of the buffer pipe. Then the pushing unit 6 is moved forward so as to push the marking tubes until the second marking tube 2*b* exits the buffer pipe 42 and applies onto the cable 3.

In brief, at each desired position (target point), one tube (the first out tube) is pushed from the buffer pipe onto the running cable by the pushing unit 6, which is actuated in a pilgrim step movement (forward, up, backward and down again). The cycle is repeated as many times as necessary to apply all the marking tubes the cable is intended to receive.

To increase the precision of the positioning, it is possible to slow down the cable or even to stop it at the time a target point reaches the exit end of the buffer pipe and a marking tube is pushed to exit the buffer pipe (especially for long distances between the target points, e.g. for distances of more than 5 m).

The position of the heating unit 9 can be adjustable according to the length of the pipes. It is also possible to provide a movable heating unit which can move along the driving axis in a given range to follow the marking tube. Following the marking tube allows for higher cable speeds or longer heating time.

Figure 9:
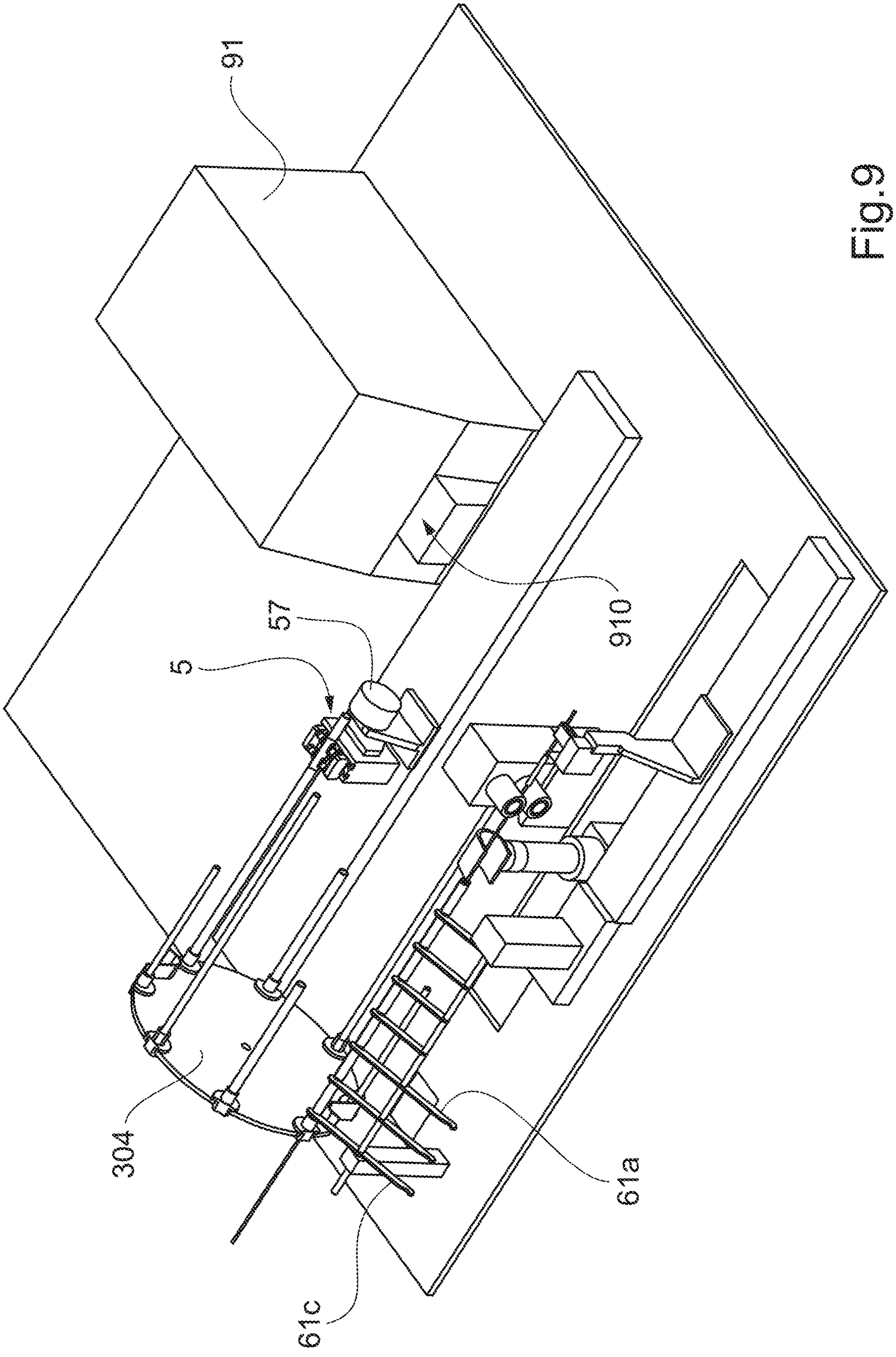
FIG. 9 is a schematic perspective view of a device for applying marking tubes according to a fourth embodiment of the invention, which is similar to the third embodiment as for the buffer pipes but different from this fourth embodiment as for the pushing unit.

In the embodiments illustrated in FIGS. 2, 9 and also FIGS. 8*a* to 8*d*, the pushing unit 6 includes a plurality (a first set) of blades 6*a* to 6*g* equally spaced apart one another with a distance corresponding to the length of the marking tubes 2*a*-2*g* to be applied.

The tube applicator according to the invention can be configured to handle marking tubes of different lengths or cables of different lengths or both. In all that cases, it can be advantageous to provide the pushing unit with a second set of blades such as the blades 61*a*-61*c* of the first embodiment of FIG. 2 and of the fourth embodiment of FIG. 9, the second set of blades having a number of blades which is different from the first set of blades. Alternatively, the 2$^{nd}$ set of blades could have an interval between the blades different from the interval of the first set of blades in order to handle marking tubes having a different length.

When the free end 31 of the cable reaches the end of the buffer pipe the clamp 83 catches the cable 3 and pulls it through the heating unit 9 and the guiding rolls 82. The movable clamp 83 is further moved along the driving axis 300 to bring the leading end of the cable out of the tube applicator to the next processing station 35. When the cable reaches a desired length, the cable is cut by the cable cutter in the measuring and cutting station 33. When the following end of the cable 3 reaches the end of the buffer pipe the cable is caught by the clamp 83, which brings the following end to the next processing station 35. It is to be noted that, alternatively, the additional pair of guiding rolls 82 might be also driving rolls.

Figure 4:
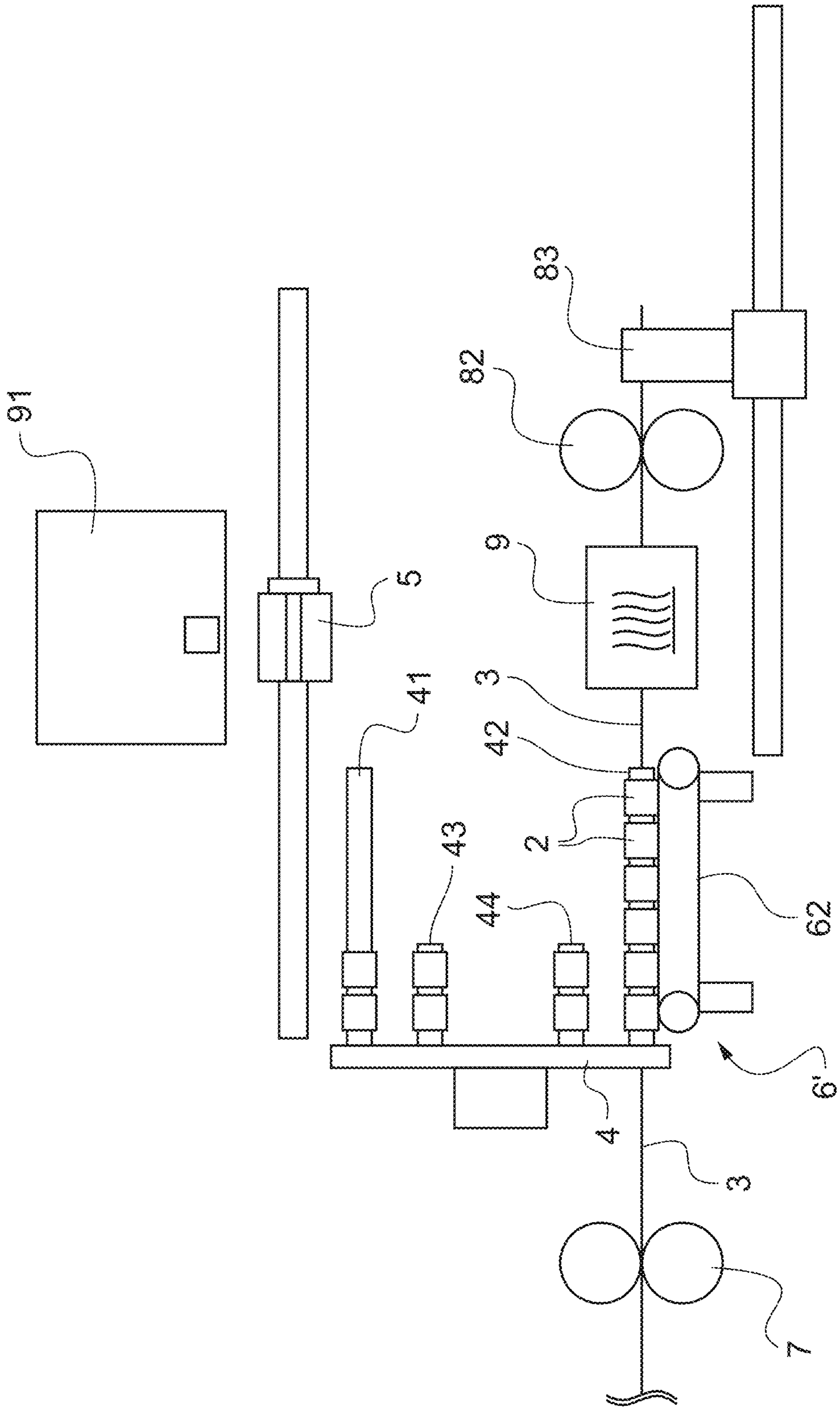
FIG. 4 is a schematic top view of a second embodiment of a device according to the invention. This second embodiment is similar to the first one of FIG. 2 excepted for the pushing unit.

The second embodiment illustrated in FIG. 4 also includes four buffer pipes mounted on a carousel, more precisely a pair of short buffer pipes and a pair of long buffer pipes. But it differs from the first embodiment of FIG. 2 in that its pushing unit 6' includes a belt 62 brought into contact with the marking tubes loaded on the buffer pipe 42 in producing position. Eventually, this embodiment can be configured to be used with marking tubes having different lengths.

Figure 5:
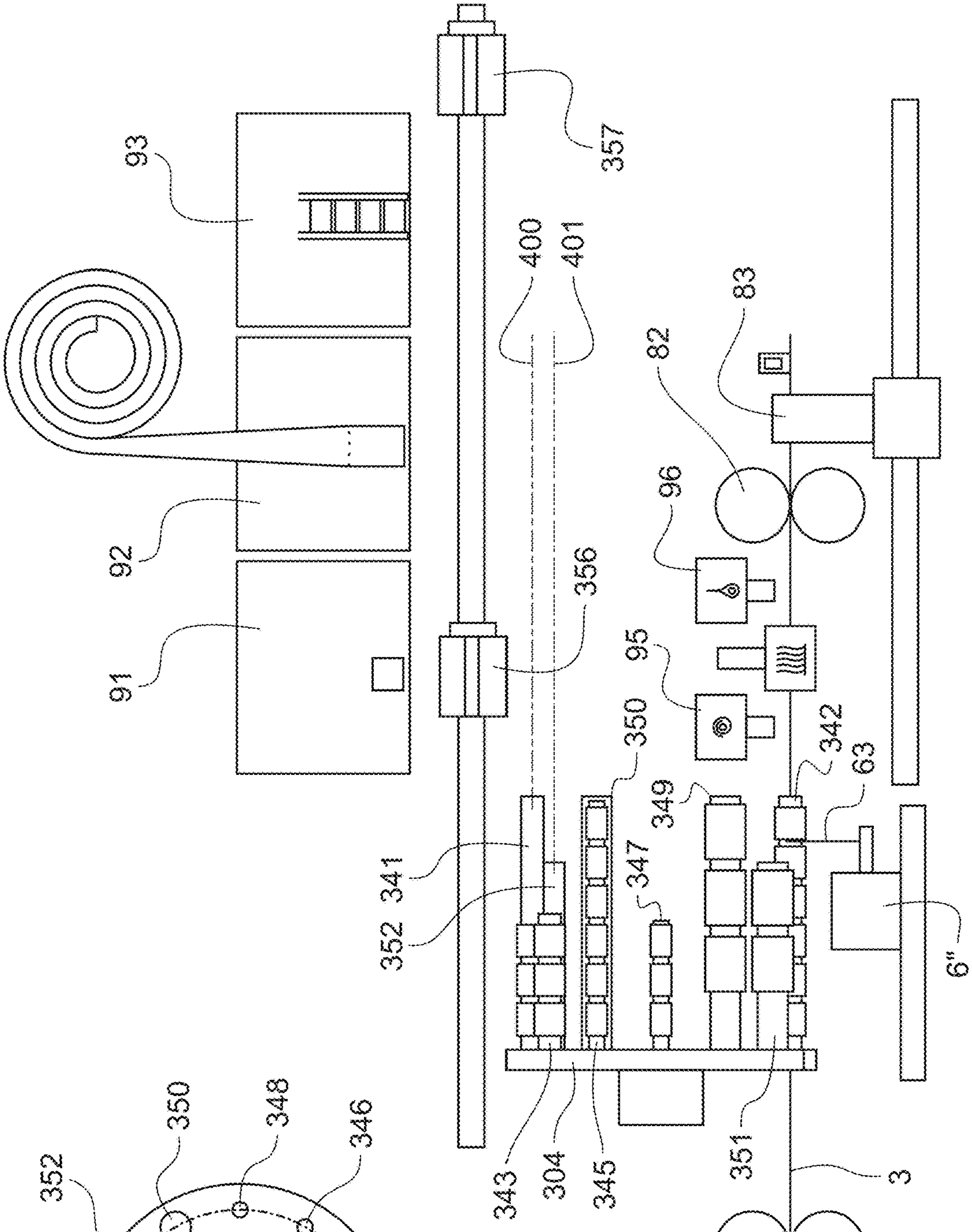
FIG. 5 is a schematic top view of a device for applying marking tubes according to a third embodiment of the invention, configured to be used with three types of marking tubes of different sizes. The carousel bears six pairs of buffer pipes and the applying device is associated with three different printers providing the required marking tubes.
Figure 6:
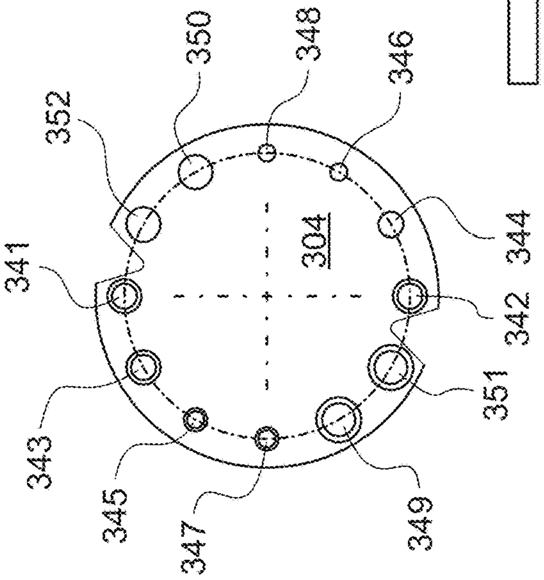
FIG. 6 is a schematic side view of the carousel of the device of FIG. 5.
Figure 7:
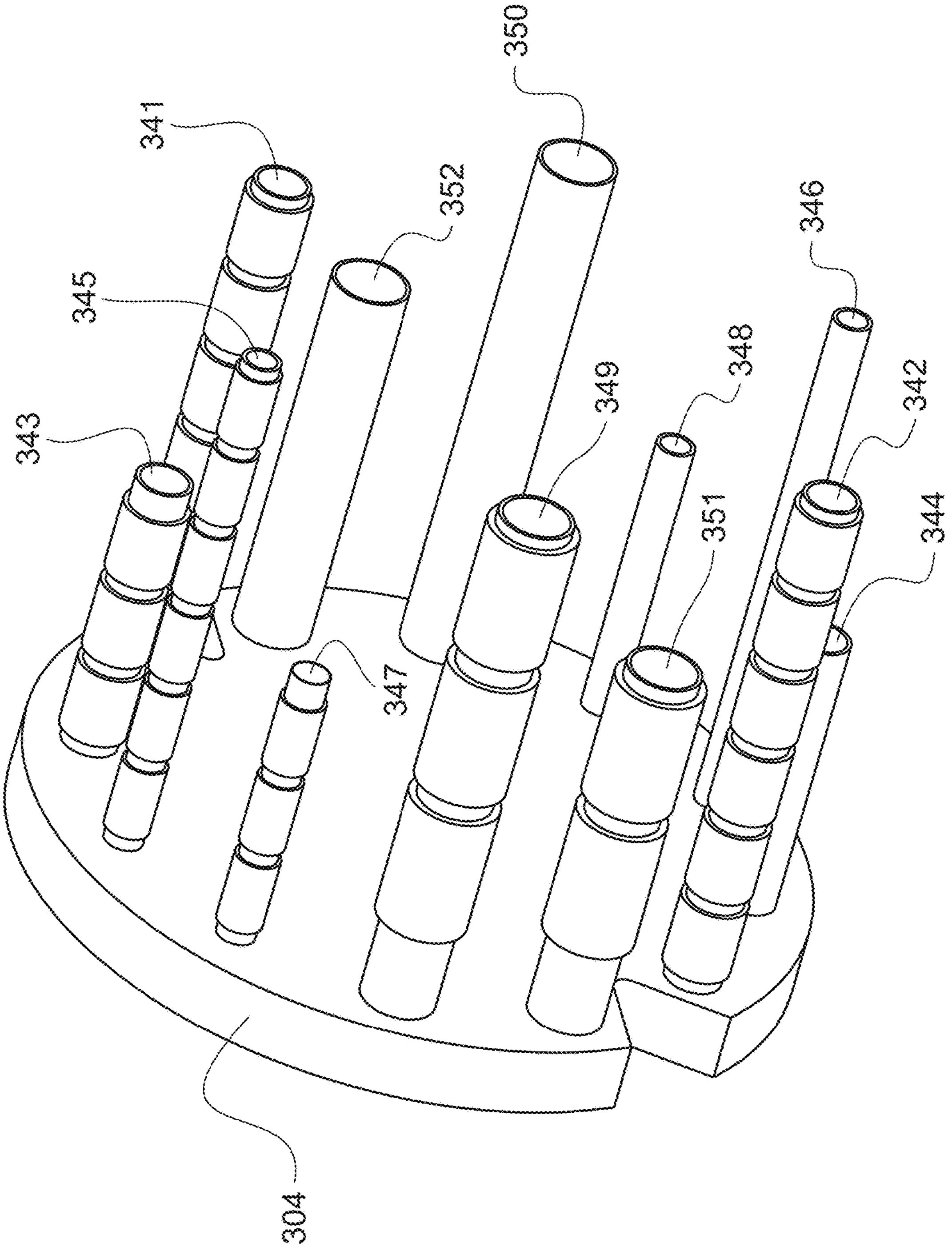
FIG. 7 is a schematic perspective view of the carousel of FIG. 6.

The third embodiment illustrated in FIG. 5 also differs from the preceding embodiments in that its pushing unit 6" has only one blade 63 or a gripper able to move along the entire length of the longest pipe, so as to move each marking tube individually.

A more important difference is to be noticed concerning this third embodiment, which is configured to process a sequence of different cables (differing in length, diameter and/or types of marking tube). For this, the tube applicator has six different pairs of buffer pipes 341-352 (12 pipes in total) for three different types of marking tubes and two ranges of cable lengths (long and short). The buffer pipes 341-352 are mounted on a carousel 304 and can be added, removed or exchanged to fit the production job. Depending on the size and number of the marking tubes and on the cable length, longer or shorter, larger or narrower buffer pipes are chosen. The buffer pipes of each pair are preferably arranged 180° from each other on the carousel (at opposite sides from the central axis of the carousel). The 180° positioning allows the gripping unit to load a buffer pipe, while the other buffer pipe of the pair is used in production to position the marking tubes on the cable.

In order to handle different types of marking tubes, the tube applicator illustrated in FIG. 5 is associated with three printers 91-93. Adding more printers allows to handle not only marking tubes differing in length and/or diameter, but also marking tubes that are differently packaged. Indeed, marking tubes can be provided in a "ladder" format or can come as endless tube from a spool (the marking tubes are then cut at the desired length exiting the printer).

Another difference of the third embodiment of FIG. 5 is that the tube applicator comprises two tilting gripping units 356 and 357, one with suction pads and one with squeezing jaws. The arrangement of the carousel 304 and the gripping units 356,357 allows each gripping unit, with its trajectory around the pivot point, not only to load the buffer pipe 341 in the preparing position aligned with the axis 400 but also the following buffer pipe 352. In other words, there are two preparing positions aligned with two preparing axis 400 and 401 respectively. The gripping unit which is not used can be moved to a standby position. The gripping units are fast enough at loading the buffer pipes with marking tubes that switching from one to the other doesn't significantly slow down the overall process.

Another embodiment foresees only one gripping unit with (automatically) exchangeable opening heads. In a further embodiment a double-gripping unit having two opening heads as previously explained is used instead of two independent gripping units.

Figures 16A, 16B, 16C:
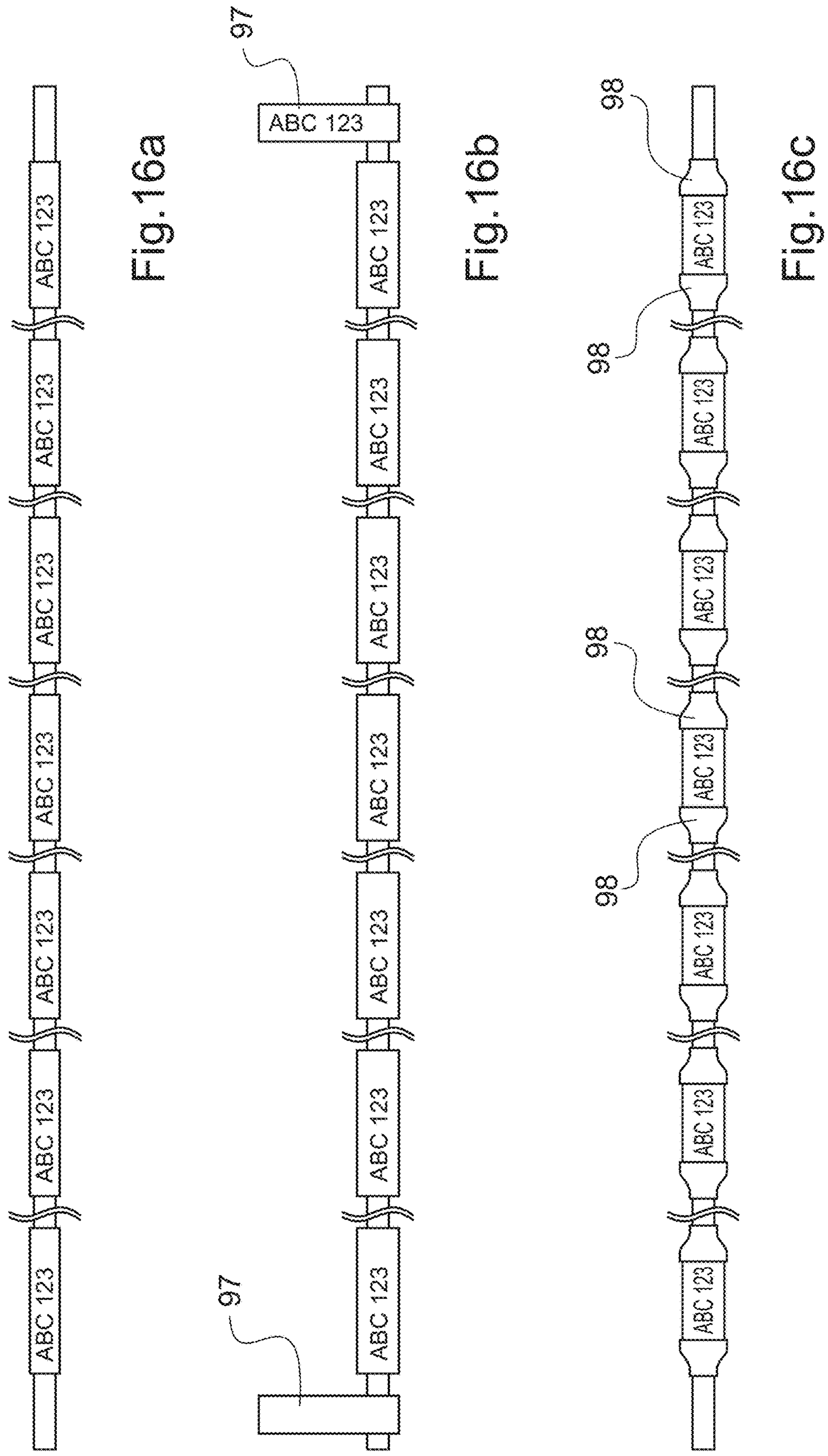
FIG. 16*a-c* shows marked cables with seven marking tubes in place. The first cable of FIG. 16*a* is marked with heat-shrinkable marking tubes. The second cable of FIG. 16*b* is marked with non-shrinkable marking tubes which are hold onto the cable by flags secured to the ends of the cable. The third cable of FIG. 16*c* is marked with non-shrinkable marking tubes individually held in place by two pieces of adhesive tape wrapped around the ends of the marking tube.

Moreover, the third embodiment of FIG. 5 further includes additional means, in particular for processing heat sensitive cables (e.g. some fibre optic cables), such as additional means for securing to the cables marking tubes that are not heat-shrinking tubes. These additional means can include a tape winding head 95 to tape one or both ends of the tubes (with pieces of tape 98) down to the cable as shown in FIG. 16*c*. The winding head 95 is arranged downstream of the buffer pipe in the producing position, for example between the exit end of the longest buffer pipe and the heating element 9 (of course when a heat sensitive cable is in progress in the tube applicator, the heating element 9 is turned off). It also can include a flag application head 96, especially for applying end flags 97 if the non-heat-shrinking marking tubes must only be prevented from falling from the cable, as it is the case for the cable shown in FIG. 16*b*. Instead of using an ordinary paper tape (forming a flag), it is also possible to associate to the tube applicator a label printer (not represented), in order to print assembly information on labels (instead of flags) to ease manual handling operations afterwards. It should be clear that the described additional means to secure non-heat-shrinking marking tubes on the cables can also be used for heat-shrinking marking tubes, especially if the heat treatment should not be applied (e.g. using certified heat shrinking marking tubes on a heat sensitive cable).

Figures 13A, 13B, 13C:
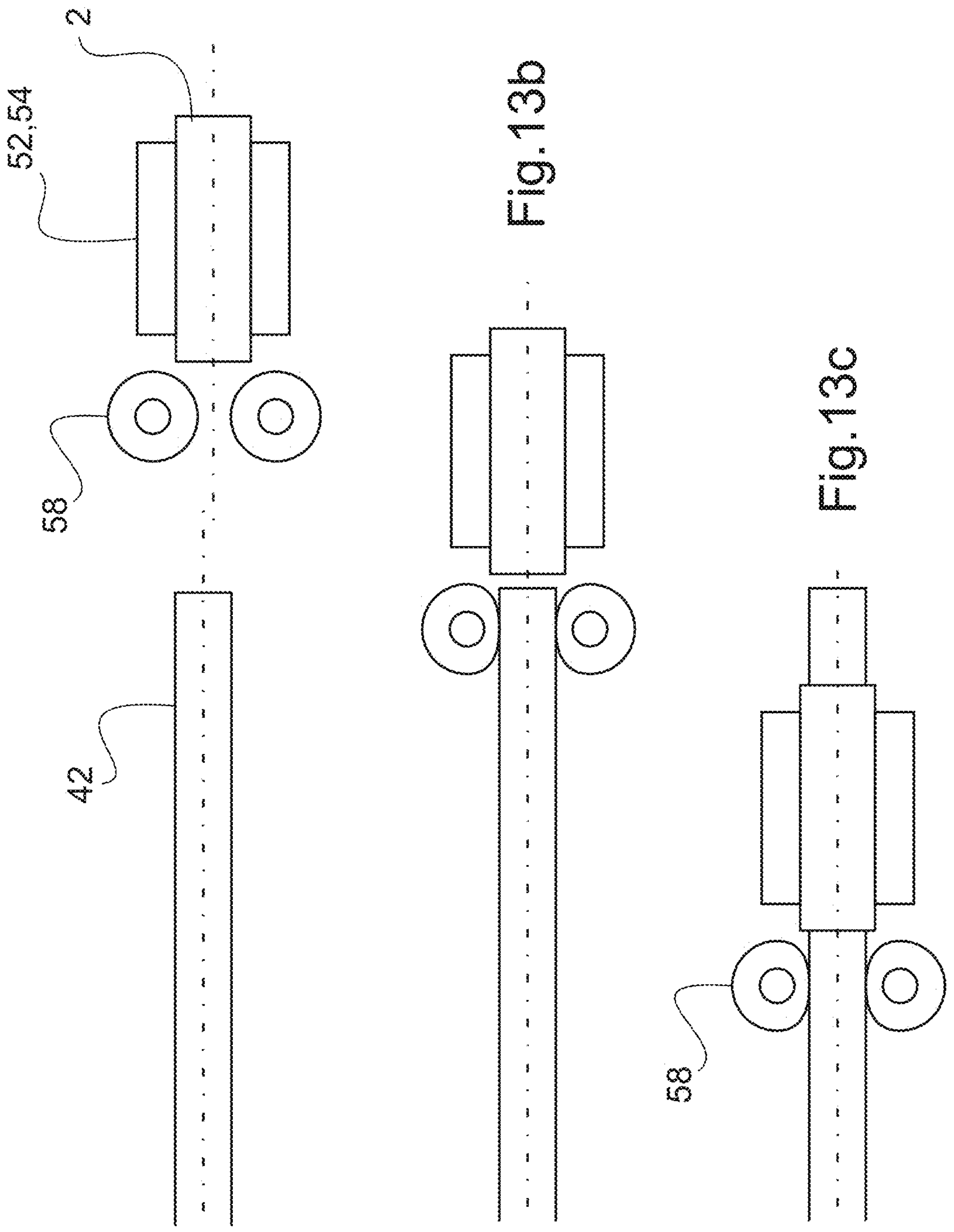
FIG. 13*a-c* shows a simplified representation in operation of an embodiment of a gripping unit further having soft guiding rolls, loading a marking tube on a buffer pipe.
Figures 14A, 14B, 14C:
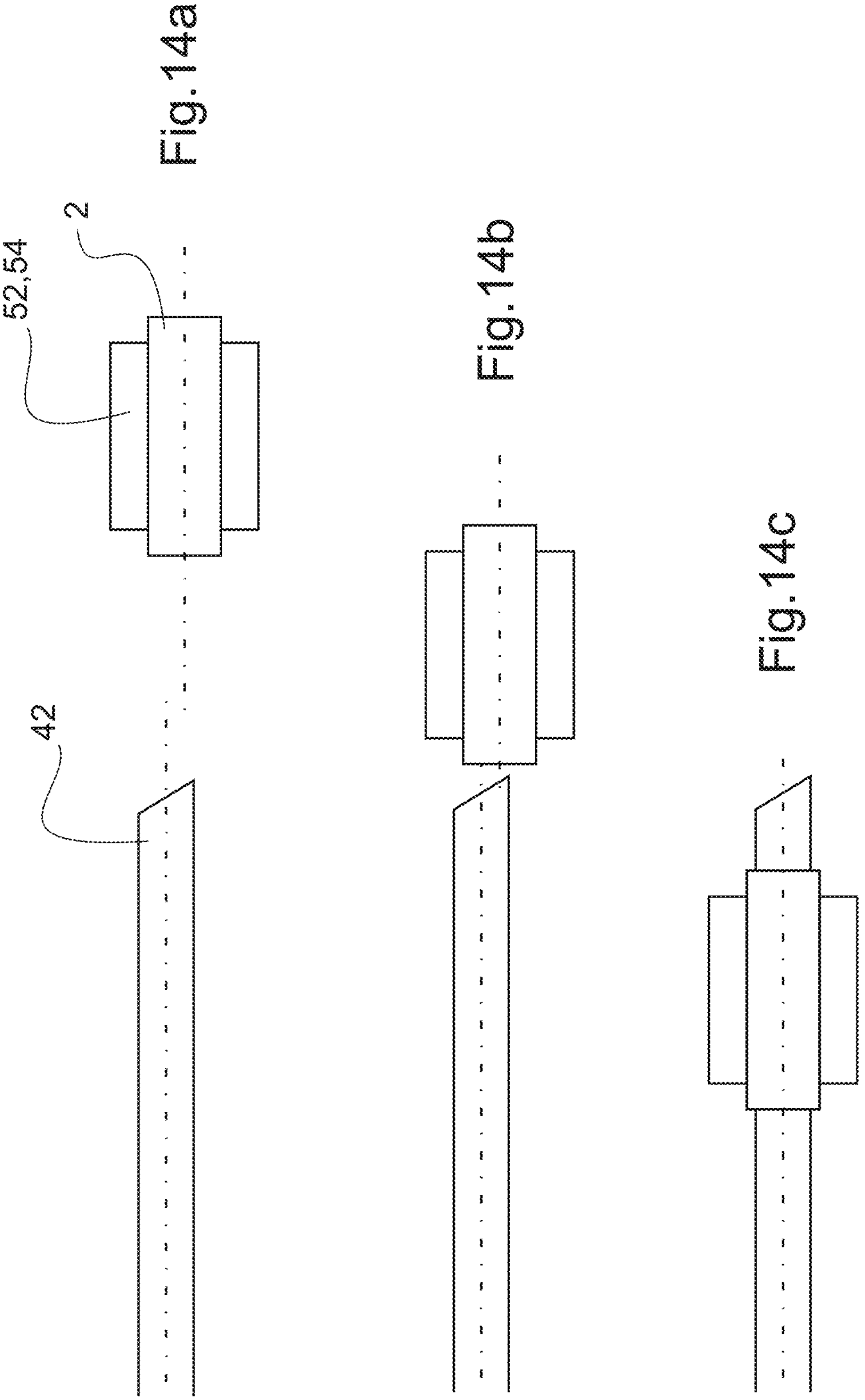
FIG. 14*a-c* shows a simplified representation in operation of an embodiment of a gripping unit loading a marking tube on a needle tip buffer pipe.
Figure 15A:
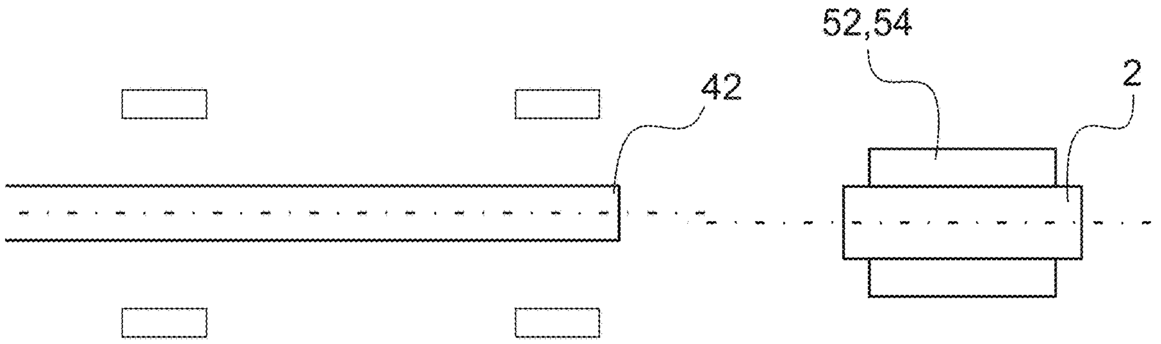
FIG. 15*a-d* shows a simplified representation of a gripping unit placing a marking tube on a buffer pipe supported by position clamps.
Figure 15B:
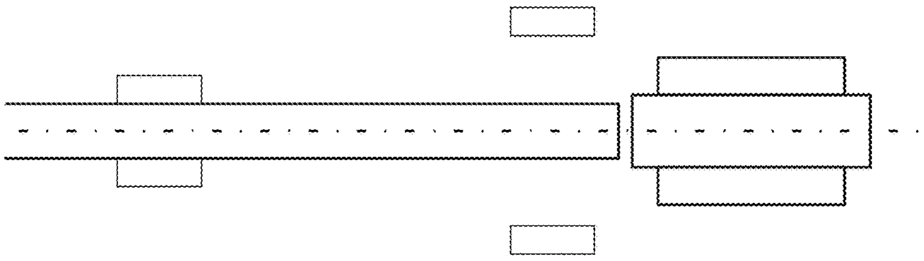
Figure 15C:
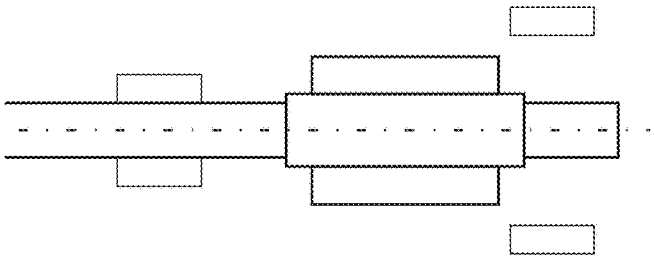
Figure 15D:
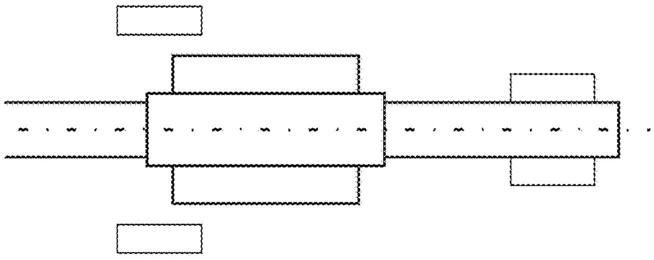

To facilitate the loading of the marking tubes on the buffer pipes, the buffer pipes are tapered or have a needle tip as shown in FIG. 14*a*-14*c* and/or the gripping unit has additional guiding means. The guiding means can be a funnel (not represented), adjustable guiding rolls (not represented), soft guiding rolls 58 (see FIG. 13*a*-13*c*) spaced apart with a fixed distance from each other or positioning clamps (see FIG. 15*a*-15*c*), separate from the gripping unit, to hold the pipe in place.

It should be mentioned that the elements and solutions of each described embodiment are not exclusive to one or the other embodiment. Depending on the desired function range the elements should be selected and combined (as soon as they do not interfere). All possible combinations are within the scope of invention.

The invention extends to all the alternative embodiments that are covered by the appended claims. For example, although it would be very less productive, the applicator can have only one buffer pipe and/or can be devoid of carousel or other shifting mechanism, each buffer pipe being arranged in a fixed position where it can be successively prepared (loaded) and used for production.

The invention claimed is:

1. A device for applying marking tubes onto cables, the device comprising:

the marking tubes (2, 2a), a marking zone (100) where a cable to be marked can be received and where a number of marking tubes (2) to be applied onto the cable to be marked can be released onto the cable to be marked, a driving mechanism for driving forward the cable to be marked along a driving axis (300), the device comprising:

at least one buffer pipe (42) which can be arranged in a producing position in the marking zone where the at least one buffer pipe is aligned with the driving axis (300), the at least one buffer pipe having an inner diameter larger than the diameter of the cable (3) to be marked, whereby the cable to be marked (3) can run forward along the driving axis through the at least one buffer pipe (42) in the producing position, the at least one buffer pipe having an outer diameter less than the inner diameter of the marking tubes (2) to be applied, whereby the marking tubes to be applied can be threaded onto the at least one buffer pipe; and a pushing unit (6) configured for engaging and pushing forward along the driving axis at least one first marking tube (2a) of the marking tubes to be applied threaded on the at least one buffer pipe (42) until the first marking tube (2a) exits the buffer pipe and surrounds the cable to be marked (3), and then releasing the first marking tube (2a) onto the cable to be marked (3);

wherein the marking tubes have a minimum length in an axial direction long enough for the marking tubes to wear a printed identification text, and wherein the at least one buffer pipe (42) has a length at least equal to the total length of the number of marking tubes to be applied on the at least one buffer pipe, whereby the at least one buffer pipe in the producing position can be loaded with the number of marking tubes (2a-2g); and further comprising:

a preparing zone (200), apart from the marking zone (100), including:

a preparing position for the buffer pipe where the buffer pipe is aligned with a preparing axis (400);

a gripping unit (5) for loading a second buffer pipe (41) of the at least one buffer pipe in the preparing position with the marking tubes (2), the gripping unit being configured for picking up the marking tubes from a marking tube delivering slot (910), moving along the preparing axis until the picked up marking tubes totally engage the second buffer pipe placed in the preparing position, and then releasing the picked up marking tubes onto the second buffer pipe; and a shifting mechanism (4, 304) for shifting the at least one buffer pipe between the producing position and the preparing position.

2. The device according to claim 1, wherein the gripping unit (5) in the preparing zone (200) comprises a first opening head (51) with suction pads (52) and a second opening head (53) with squeezing jaws (54), the first and the second opening head being arranged on a tilting common mounting (55), the mounting being tilted to use alternatively the first or the second opening head.

3. The device according to claim 1, wherein the preparing zone includes a printer (91) arranged upstream of the delivering slot (910).

4. The device according to claim 1, wherein the marking tubes have various types differing in diameter and/or length and/or packaging, wherein the preparing zone comprises several delivering slots including said delivery slot, namely one said delivering slot for each type of the marking tubes, the gripping unit being configured to be translated between the preparing position and each of the delivering slots.

5. The device according to claim 4, wherein the preparing zone includes several printers (91-93), each said delivering slot being fed by one of the several printers.

6. Method for applying marking tubes to cables, wherein the method uses a device according to claim 1 and wherein:

said at least one buffer pipe (42) previously loaded with the marking tubes (2) needed is placed in the producing position;

the cable (3) to be marked is pushed forward along the driving axis (300) through the at least one buffer pipe in the producing position (42);

when a target point (P1) on the cable to be marked reaches an exit end of the at least one buffer pipe (42), the first marking tube (2a) on the at least one buffer pipe is pushed forward along the driving axis (300) until the first marking tube (2a) exits the at least one buffer pipe and is released onto the cable to be marked; and the cable to be marked (3) is kept on running forward along the driving axis (300) and when a next target point on the cable reaches the exit end of the at least one buffer pipe, a new first marking tube (2b) on the at least one buffer pipe is pushed forward along the driving axis until the new first marking tube (2b) exits the at least one buffer pipe and is released onto the cable to be marked, and the method is repeated until all the marking tubes (2a-2g) initially loaded on the at least one buffer pipe (42) are thus applied onto the cable to be marked (3).

7. The device according to claim 1, wherein the shifting mechanism comprises a carousel bearing the at least one buffer pipe.

8. The device according to claim 1, further comprising a plurality of buffer pipes (41-44; 341-352) which include the at least one buffer pipe and the second buffer pipe and wherein the shifting mechanism is configured for positioning the buffer pipes in the preparing position and in the producing position.

9. The device according to claim 8, wherein the plurality of buffer pipes comprises different outer diameters for receiving marking tubes with various diameters.

10. The device according to claim 9, wherein the shifting mechanism comprises a carousel bearing the at least one buffer pipe.

11. The device according to claim 8, wherein the plurality of buffer pipes comprises at least one long buffer pipe (41; 341) and at least one short buffer pipe (43; 343) having same outer diameters but different lengths for receiving different numbers of the marking tubes (2) comprising same diameters and/or for producing cables of various lengths.

12. The device according to claim 11, to be used with the marking tubes having a first length, wherein the pushing unit (6) includes a first set of parallel and coplanar blades (6*a*-6*g*) extending on a first side of a shaft parallel to the driving axis (300), the blades being equally spaced apart from one another along the shaft with a first interval corresponding to the first length of the marking tubes (2*a*-2*g*), the shaft being rotated and translated such that the blades (6*a*-6*g*) are moved along the driving axis in a pilgrim step movement.

13. The device according to claim 9, wherein the pushing unit includes a second set of parallel and coplanar blades (61*a*-61*c*) also borne by the shaft which bears the first set of blades but extending on a second side of the shaft, the second set of blades being also equally spaced apart from one another along the shaft with the first interval, the first set of blades having a number of blades corresponding to the number of marking tubes that can be threaded onto the longest of the buffer pipes (41, 42) and the second set of blades having a number of blades corresponding to the number of marking tubes that can be threaded onto the shortest buffer pipe (43, 44).

14. The device according to claim 12, suitable for handling the marking tubes having a first length and a second type of marking tubes having a second length, wherein the pushing unit includes a second set of parallel and coplanar blades also borne by the shaft which bears the first set of blades but extending on a second side of the shaft, the second set of blades being equally spaced apart from one another along the shaft with a second interval corresponding to the second length of the second type of marking tubes.

15. The device according to claim 8, wherein the plurality of buffer pipes comprises several pairs of said buffer pipes, two said buffer pipes (41, 42; 341, 342) of a same pair being identical, and said buffer pipes (41, 43; 341,343, 345, 347, 349, 351) of different pairs having different outer diameters and/or different lengths from other said pairs.

16. The device according to claim 15, wherein the shifting mechanism comprises a carousel bearing the at least one buffer pipe.

17. The device according to claim 16, wherein for each said pair of buffer pipes, the two buffer pipes (41, 42; 341, 342) of the pair are arranged diametrically opposed on the carousel (4; 304).

18. The device according to claim 8, wherein the plurality of buffer pipes comprises at least one long buffer pipe (41; 341) and at least one short buffer pipe (43; 343) having the same outer diameters but having different lengths for receiving different numbers of the marking tubes (2) of the same diameter and/or for producing cables of various lengths.

19. The device according to claim 8, wherein the shifting mechanism comprises a carousel bearing the at least one buffer pipe.

* * * * *